United States Patent
Loveday et al.

(10) Patent No.: US 8,991,488 B2
(45) Date of Patent: Mar. 31, 2015

(54) SYSTEM AND METHOD FOR EXTRACTING ENERGY

(75) Inventors: Ronald L. Loveday, Newmarket, TX (US); J. Paul Mueller, Jr., College Station, TX (US)

(73) Assignee: InnerGeo LLC, Corpus Christi, TX (US)

(*) Notice: Subject to any disclaimer, the term of this patent is extended or adjusted under 35 U.S.C. 154(b) by 0 days.

(21) Appl. No.: 13/298,058

(22) Filed: Nov. 16, 2011

(65) Prior Publication Data

US 2012/0117967 A1    May 17, 2012

Related U.S. Application Data

(60) Provisional application No. 61/458,056, filed on Nov. 16, 2010.

(51) Int. Cl.
| | | |
|---|---|---|
| *E21B 43/00* | (2006.01) | |
| *E21B 36/00* | (2006.01) | |
| *F03G 7/04* | (2006.01) | |
| *F24J 3/08* | (2006.01) | |
| *F28F 1/40* | (2006.01) | |

(52) U.S. Cl.
CPC ............... *E21B 36/003* (2013.01); *F03G 7/04* (2013.01); *F24J 3/086* (2013.01); *F28F 1/40* (2013.01); *Y02E 10/16* (2013.01)
USPC ..... 166/242.3; 166/313; 166/380; 166/242.1; 166/263

(58) Field of Classification Search
USPC ................ 166/263, 302, 305.1, 313, 369, 57, 166/242.3, 268, 380, 242.1
See application file for complete search history.

(56) References Cited

U.S. PATENT DOCUMENTS

| | | | | |
|---|---|---|---|---|
| 3,470,943 | A | | 10/1969 | Van Huisen |
| 3,782,468 | A | * | 1/1974 | Kuwada .................. 166/267 |
| 3,857,244 | A | | 12/1974 | Faucette |
| 3,863,709 | A | | 2/1975 | Fitch |
| 3,875,749 | A | * | 4/1975 | Baciu .................... 60/641.2 |
| 3,986,362 | A | | 10/1976 | Baciu |
| 4,052,857 | A | * | 10/1977 | Altschuler ............... 60/641.2 |
| 4,082,140 | A | | 4/1978 | Erwin |

(Continued)

OTHER PUBLICATIONS

International Search Report and Written Opinion issued for PCT/US2011/061037 dated Jul. 9, 2012, 11 pages.

(Continued)

*Primary Examiner* — Jennifer H Gay
*Assistant Examiner* — Elizabeth Gitlin
(74) *Attorney, Agent, or Firm* — Norton Rose Fulbright US LLP

(57) ABSTRACT

A method and apparatus for extracting geothermal energy from a subterranean thermal reservoir through a wellbore where the heat exchange fluid is introduced at a slower velocity than the velocity at which the fluid is extracted. The method and apparatus further comprises a gas zone near the top of the wellbore to maintain the thermal energy of the heat exchange fluid. In one embodiment, a portion of the casing of the wellbore can directly contact the subterranean environment. Alternatively, a thermally conductive wall comprising a thermally conductive material can surround a portion of the casing of the wellbore. Further, the inner and/or outer surface of the pipes and conduits of the disclosed method and apparatus can include modified surface features that influence the flow and/or thermal conductivity of the heat exchange fluid.

24 Claims, 5 Drawing Sheets

(56) References Cited

U.S. PATENT DOCUMENTS

| | | |
|---|---|---|
| 4,085,795 A | 4/1978 | Gill |
| 4,201,060 A | 5/1980 | Outmans |
| 4,290,266 A | 9/1981 | Twite et al. |
| 4,357,802 A | 11/1982 | Wahl et al. |
| 4,397,612 A * | 8/1983 | Kalina .............................. 417/54 |
| 4,512,156 A * | 4/1985 | Nagase ......................... 60/641.2 |
| 4,774,006 A * | 9/1988 | Kaufmann .................... 210/742 |
| 5,072,783 A | 12/1991 | Martinez et al. |
| 5,370,182 A * | 12/1994 | Hickerson ..................... 166/401 |
| 5,515,679 A | 5/1996 | Shulman |
| 6,301,894 B1 | 10/2001 | Halff |
| 6,523,615 B2 * | 2/2003 | Gandy et al. ................... 166/381 |
| 6,745,815 B1 * | 6/2004 | Senyard et al. ................ 160/370 |
| 6,789,608 B1 | 9/2004 | Wiggs |
| 2008/0016894 A1 * | 1/2008 | Wiggs .............................. 62/260 |
| 2009/0126923 A1 * | 5/2009 | Montgomery et al. ......... 166/57 |
| 2011/0067399 A1 * | 3/2011 | Rogers et al. ................ 60/641.2 |
| 2011/0232795 A1 * | 9/2011 | Hardin .......................... 138/111 |

OTHER PUBLICATIONS

International Preliminary Report on Patentability mailed May 30, 2013, during the prosecution of International Application No. PCT/US2011/061037.

* cited by examiner

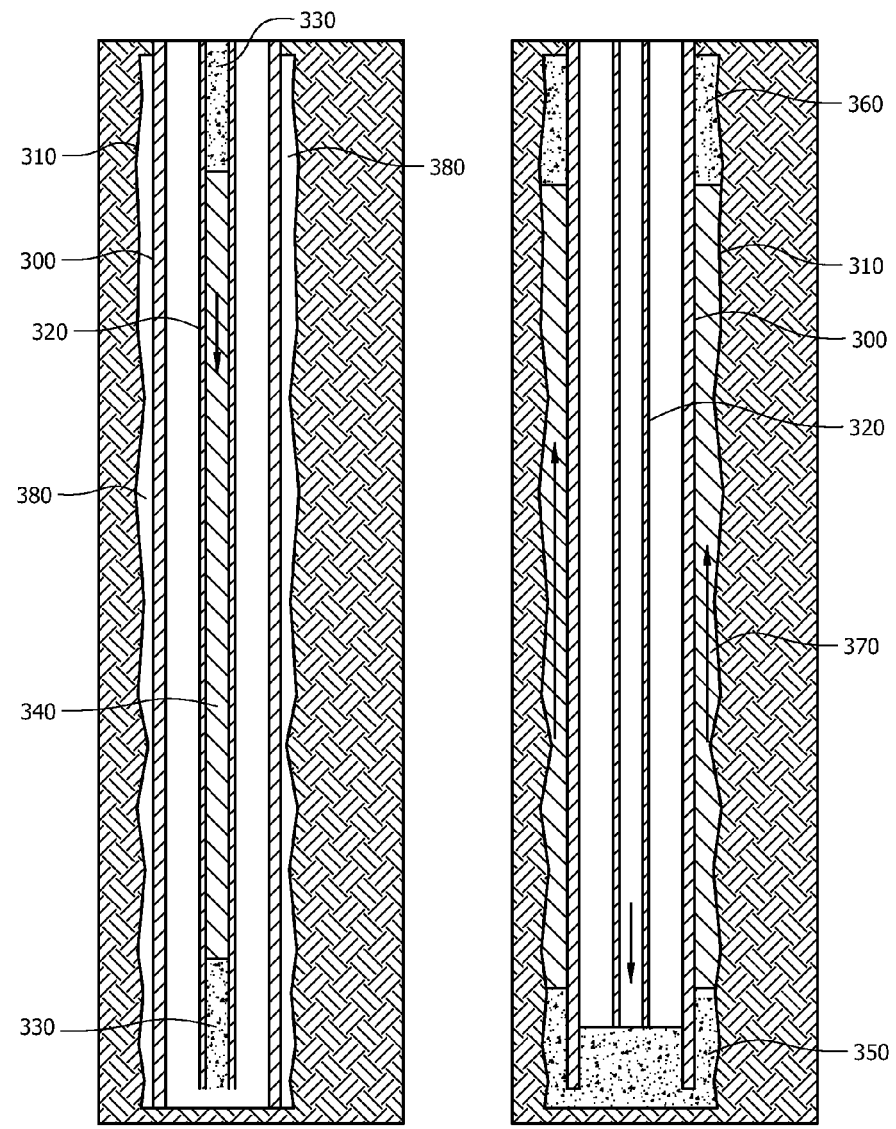
*FIG. 3A*  *FIG. 3B*

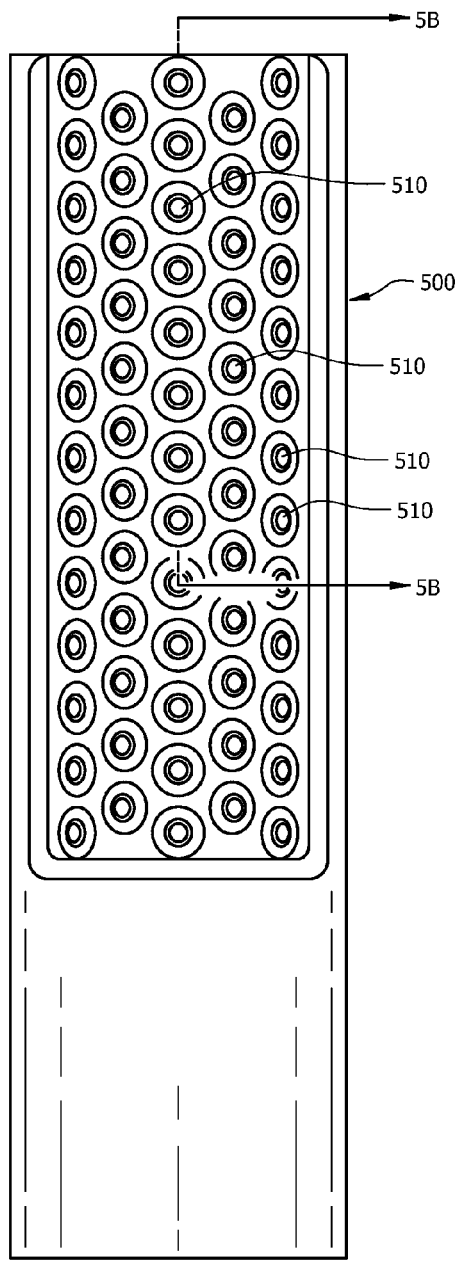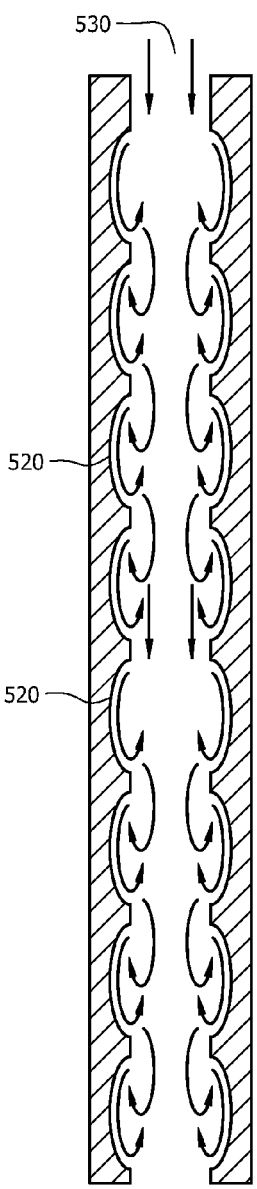
FIG. 5A
FIG. 5B

SYSTEM AND METHOD FOR EXTRACTING ENERGY

CROSS-REFERENCE TO RELATED APPLICATIONS

The present application claims priority to U.S. provisional application Ser. No. 61/458,056, which was filed on Nov. 16, 2010, entitled Geothermal Well and System for Generating Electricity, the disclosure of which is incorporated by reference herein in its entirety.

TECHNICAL FIELD

This invention generally relates to systems and methods for extracting energy, particularly extracting thermal energy using a geothermal well to deliver to the surface a hot fluid for use in generating electricity or performing other work.

BACKGROUND OF THE INVENTION

There are known methods to harvest the heat below the surface to drive motors and generate electricity or perform other work. One type of geothermal system involves producing hot water and/or steam already present in underground formations. Another type of geothermal system involves introducing fluids directly into the underground formations to absorb the heat and recovering the fluids, along with the absorbed heat. Typical disclosures of these types of geothermal systems are provided by U.S. Pat. Nos. 4,082,140, 4,201,060, and 4,357,802, as well as in commercial operations in California and Iceland.

Other methods of harvesting this heat includes geothermal systems that pump a working fluid, such as water, through a casing in a bore hole that extends into a hot section of the earth's crust. The heat in the earth turns the working fluid into steam, which is produced at the surface, and then condensed and purified to be pumped back into the casing. Typical disclosures of this type are found in U.S. Pat. Nos. 3,470,943, 4,085,795, 5,072,783, 5,515,679, and 6,301,894.

This type of geothermal system has certain advantages over producing heated formation fluids directly or introducing fluids into the formations to be produced, such as minimizing problems of subsidence or seismicity in the rocks adjacent the geothermal wells and disposing produced fluids. While it is an improvement, this type of geothermal system still suffers from certain disadvantages. For instance, these geothermal systems often perforate the casing to facilitate the heat exchange between the formation and the working fluid. As such, additional water from another source such as well, lake, or municipal is often needed to be pumped through the casing to recover the heat below. Further, due to the perforations of the casing introducing particulates from the surrounding environment to the heated fluid, this type of geothermal system also often require a purification system to process the heated fluid before it can be circulated again.

BRIEF SUMMARY OF THE INVENTION

According to one aspect of the present disclosure, there is provided a well that extends from a location at or above the surface of the earth to a subterranean environment, the well comprising a wellhead at or above the surface of the earth; a wellbore extending from the surface of the earth to the subterranean location; an injection conduit disposed in the wellbore, a portion of the injection conduit extended from the surface to a first location in the subterranean environment, wherein the injection conduit has a first inner diameter. The well further comprises a production conduit disposed in the wellbore, a portion of the production conduit extended from the surface to a second location in the subterranean environment, wherein the production conduit has a second inner diameter; where the production conduit is fluidly coupled to the injection conduit through the wellbore, the first inner diameter is greater than the second inner diameter.

In one embodiment, a portion of the subterranean environment comprises a temperature of at least about 300 degrees F., and the well further comprises a heat exchange fluid. In another embodiment, the heat transfer fluid comprises a fluid selected from the group consisting of water, alcohol, refrigerant, and a combination thereof. In yet another embodiment, the wellbore further comprises a volume of heat exchange fluid in liquid form; and a gas zone located above the volume of heat exchange fluid. In one embodiment, the gas zone is at a pressure greater than atmospheric pressure. In another embodiment, the gas zone comprises a gas selected from a group consisting of air, nitrogen, argon, other suitable gases, and a combination thereof.

In one embodiment, the first inner diameter and the second inner diameter has a ratio selected from the group consisting of 8.3, greater than 1, greater than 1.5, greater than 2, and greater than 2.5.

In another embodiment, the well further comprises an energy extraction system fluidly coupled to the production conduit.

In one embodiment, the production conduit comprises a thermally-insulating material for at least a portion of its length.

In one embodiment, the well further comprises a casing between the wellbore and the earth, wherein at least a portion of the casing direct contacts the subterranean environment. In another embodiment, at least a portion of the casing is surrounded by a thermally conductive wall. In yet another embodiment, the casing is imperforate.

In one embodiment, at least one of said injection conduit and said production conduit comprises surface features. In another embodiment, the surface features comprise dimples.

According to another aspect of the present disclosure, there is provided a method of harvesting thermal energy comprising the steps of: introducing, at a first velocity, a heat exchange fluid into a well bore through an injection conduit, wherein a portion of the wellbore is disposed in a subterranean environment; and extracting, at a second velocity, the heat exchange fluid from the well bore through a production conduit, wherein the second velocity is faster than the first velocity.

In one embodiment, a portion of the subterranean environment comprises a temperature of at least about 300 degrees F. In another embodiment, the heat transfer fluid comprises a fluid selected from the group consisting of water, alcohol, refrigerant, and a combination thereof.

In one embodiment, the method further comprises the step of: maintaining a gas zone above a volume of heat exchange fluid in the well bore, wherein the volume of heat exchange fluid is in liquid form. In another embodiment, the gas zone is at a pressure greater than atmospheric pressure. In yet another embodiment, the gas zone comprises a gas selected from the group consisting of air, nitrogen, argon, other suitable gases, and a combination thereof.

In one embodiment, the second velocity being faster than the first velocity is achieved at least with the injection conduit having a diameter that is different from a diameter of the production conduit. In another embodiment, the diameter of the injection conduit is larger than the diameter of the production conduit. In yet another embodiment, the diameter of the injection conduit and the diameter of the production conduit has a ratio selected from the group consisting of 8.3, greater than 1, greater than 1.5, greater than 2, and greater than 2.5.

In one embodiment, the method further comprises the step of producing energy from the extracted heat exchange fluid.

In another embodiment, the method further comprises the step of insulating a portion of the production conduit.

In yet another embodiment, the method further comprises the steps of providing a casing between the wellbore and the earth, and providing a thermally conductive wall around a portion of the casing. In another embodiment, the method further comprises the steps of providing a casing between the wellbore and the earth, and exposing a portion of the exterior of the casing to the subterranean environment. In yet another embodiment, the casing is imperforate.

In one embodiment, the method further comprises the step of providing at least one of the injection conduit and the production conduit with an enhanced surface area.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 3A and 3B illustrate a first exemplary well configuration according to the present disclosure;

FIGS. 5A and 5B illustrate an exemplary feature that improves the heat transfer efficiency of a well according to the embodiments the present disclosure.

DETAILED DESCRIPTION OF THE INVENTION

As used herein, "a" and "an" means one or more than one unless otherwise stated.

The present disclosure provides a system that is a closed loop geothermal system useful for wet or dry geothermal strata. In one embodiment, the well comprises a completely or partially concrete cased well with a concrete plug at the bottom, a well-head, and at least two conduits and passing through the well-head into the well. Of the two conduits, the first is an injection conduit that preferably travels to the level of stratum or depth of the well where the temperature of the earth is sufficiently high to heat the heat exchange fluid in the well. The second is an outlet conduit that is preferably longer than the injection conduit and travels to near the bottom of the well. In one embodiment, the outlet or production conduit stops short of the concrete plug at the bottom of the well as to not erode the plug. In one embodiment, the diameter of the injection conduit is larger than the diameter of the outlet conduit. The difference in size (e.g., length and diameter) affects the velocity of the heat exchange fluid traveling back to the surface, e.g., increases the velocity of the exiting fluid, thereby reducing the time the heated fluid is in contact with the lower temperature surfaces of the well, such as the cooler region in the upper part of the well where the heat exchange fluid enters.

In an alternative embodiment, the injection conduit is longer than the outlet conduit and travels to near the bottom of the well stopping short of the concrete plug. In this embodiment, the diameter of the injection conduit and the outlet conduit are preferably the same or substantially the same. In another embodiment, the injection conduit and outlet conduit can have the same length.

To further reduce the heat loss, the well employs a gas zone in the upper region in certain embodiments to insulate the two inlet and outlet conduits from one another. In addition, this gas zone is further under high pressure to increase the boiling temperature of the heat exchange fluid that has been heated by geothermal energy in the well, which keeps the exiting heat exchange fluid in liquid phase and maintains the system in stasis. The produced heat exchange fluid containing thermal energy from the earth can be used in any number of power production processes depending on the final surface temperature of the fluid. When the heat energy is used to a sufficient level, the fluid is returned down hole to be re-heated and the cycle begins again. While the well systems of the present disclosure are discussed in the context of retrieving or extracting thermal energy, it is contemplated that the disclosed well systems can be used in other applications.

Figure 1:
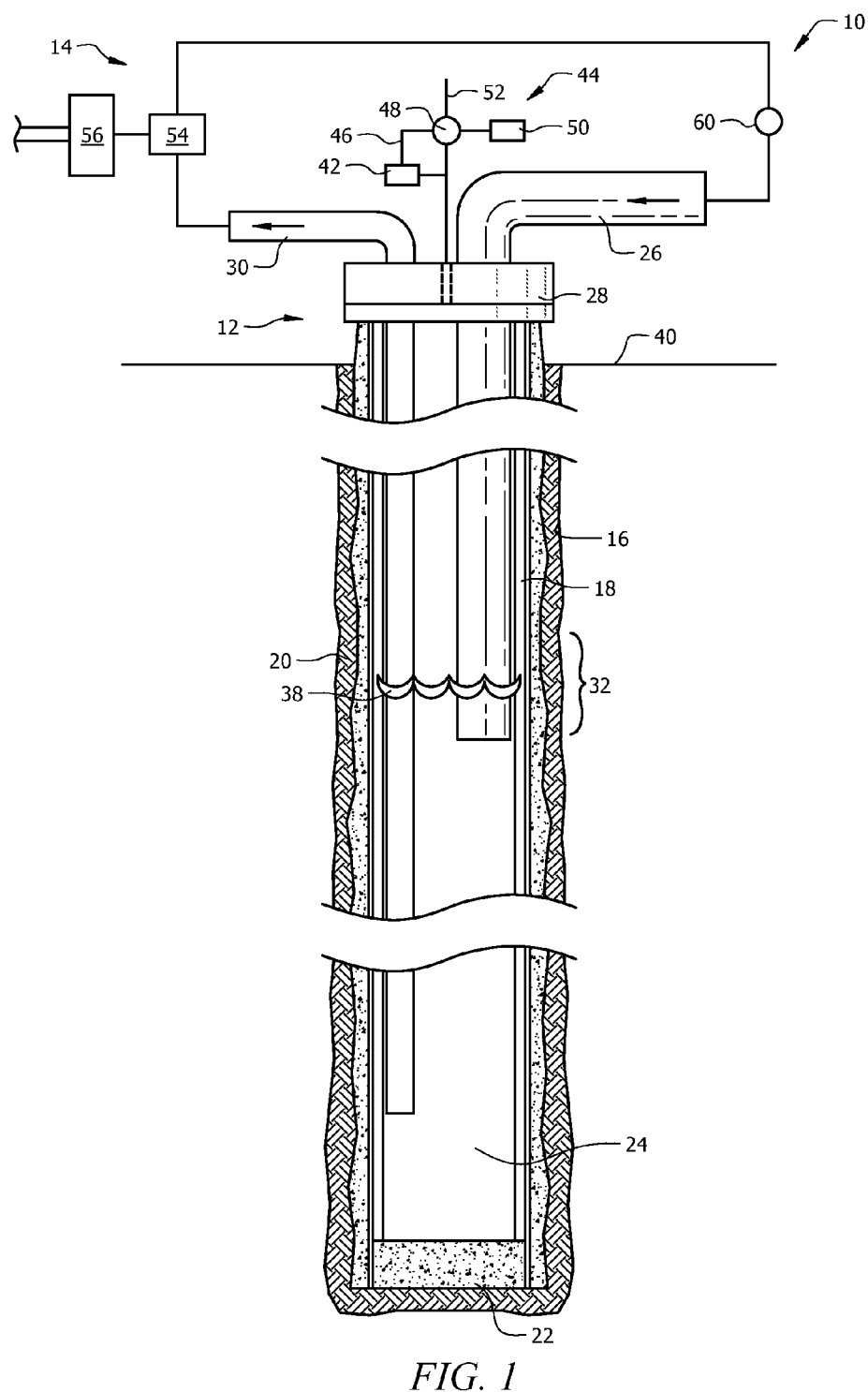
FIG. 1 shows a cross-section of a well according to a first embodiment of the present disclosure that is connected to a schematically illustrated exemplary energy extraction system.

In a specific embodiment, referring to FIG. 1, well system 10 includes one or more wells 12 extending into the earth to an area or stratum with sufficiently high temperature to be absorbed by a heat exchange or working fluid. The depth and location of these sufficiently high temperature areas are generally known or can be determined according to known methods. Associated with one or more of wells 12 is energy extraction system 14 which receives higher temperature heat exchange fluid from well 12 and converts the thermal energy of the fluid into energy of a more desirable type, usually electricity. In one embodiment, the temperature of the stratum of interest is preferably around at least 300 degrees F. In other embodiments, however, the temperature of the surrounding environment can be lower, as long as the temperature is useful for producing thermal energy. For instance, a suitable heat exchange fluid, e.g., refrigerant, can be used to extract thermal energy from an environment with temperature lower than 300 degrees F.

Referring to FIG. 1, well 12 includes bore hole or wellbore 16 extending into the earth to a high temperature region or region with at least the desired temperature. Preferably, bore hole or wellbore 16 extends to at least the heated stratum in the earth where the temperature is at least about 400 degrees F. In FIG. 1, casing or pipe string 18 is cemented in well bore 16 by cement sheath 20. Casing 18 is preferably imperforate to provide heat transfer across the casing while preventing influx of fluids from the earth into casing 18 or escape of working fluid from casing 18 into the earth. In one embodiment, casing 18 comprises a steel material. Further, in certain embodiments, the casing can be lined with or made of material that resists corrosion to ensure that the circulated heat exchange fluid is not contaminated by the surrounding environment or escapes into the surrounding environment. High temperature pipe and cement are known in the art, such as in current geothermal operations in California. In the preferred embodiment, these high temperature pipe and cement are used in system 10. In alternative embodiments, other suitable high temperature pipe and cement material can be used in system 10.

Well 12 may be vertical or, based on calculations, experience, and/or characteristics of the formation, part of well 12 can include one or more horizontal sections extending for a substantial distance in the high temperature region. The bottom or end of pipe string 18 may be closed by a suitable cap or bull plug, such as plug 22, to provide closed chamber 24 in the earth through which the heat exchange fluid circulates. The heat exchange fluid can be of any suitable type. In the preferred embodiment, a liquid is used, at least for the reason that a volume of liquid has a higher capacity to absorb heat than an equivalent volume of the same material in a gas phase. In the preferred embodiment, the heat exchange fluid comprises water. In alternative embodiments, other suitable types of heat exchange fluid or combination thereof, such as alcohol and refrigerants, are used.

Referring to FIG. 1, inlet or injection conduit 26 extends through well head 28 to deliver a lower temperature heat exchange fluid from energy extraction system 14 into chamber 24. Outlet or production conduit 30 also extends through well head 28 to deliver heat exchange fluid that has absorbed energy from the earth from well 12 to energy extraction system 14. As illustrated in FIG. 1, inlet conduit 26 preferably extends into well 12 to zone 32 where the earth's temperature is sufficiently high to transfer thermal energy to the heat exchange fluid. In the preferred embodiment, zone 32 is where the temperature of the earth is about 40-60% the temperature of the maximum sustainable temperature of well 12. One way of determining the maximum sustainable temperature of well 12 is to determine the sustainable temperature near the bottom of well 12.

For instance, in one embodiment, zone 32 is located at about a depth where the temperature of the surrounding environment is in the range of 400 degrees F. when the temperature of the earth near the bottom of well 12 is about 800 degrees F. In another embodiment, zone 32 is located at a depth where the temperature of the surrounding environment is in the range of about 200 degrees F. when the highest sustainable temperature near the bottom of well 12 is in the range of about 400 degrees F. The determination of the location of zone 32 depends on a number of factors such as the highest sustainable temperature near the bottom of well 12 and the expected volume of the heat exchange fluid in system 10. As such, the depth of zone 32 is configured for individual wells depending on the operating conditions of that particular well.

Referring to FIG. 1, in a preferred embodiment, inlet conduit 26 is of greater capacity than outlet conduit 30. In one embodiment, inlet conduit 26 has greater capacity by having a larger diameter than the diameter of outlet conduit 30. The difference in capacity between inlet conduit 26 and outlet conduit 30 allows for a greater velocity of heated working fluid through outlet conduit 30, thereby minimizing the travel time of the heat exchange fluid out of well 12, and consequently, the heat loss due to the incoming heat exchange fluid from inlet conduit 26. In addition, at least one of conduits 26 and 30 is preferably partially thermally insulated to avoid or minimize heat transfer from outlet conduit 30 to inlet conduit 26. For example, in one embodiment, outlet conduit 30 can be thermally insulated above a level where there is a net loss of heat from the heat exchange fluid to the surrounding. One way of insulating a portion of outlet conduit 30 is to provide a thermal jacket (not shown) around part or all of the outer diameter of the conduit. In one embodiment, the jacket comprises a material of low thermal conductivity. In another embodiment, the insulation is achieved through production conduit 30 comprising a double-walled conduit (not shown) for at least a portion of its length. The annular space between the outer and inner walls can comprise a gas to reduce thermal exchange between the walls, such as air, nitrogen, argon, other suitable or similar gases, or a combination thereof. Alternatively, the annular space can be at vacuum or near-vacuum. In the preferred embodiment, only the production conduit is insulated. In addition, referring to FIG. 1, inlet conduit 26 and outlet conduit 30 are preferably arranged so that the walls of these conduits 26 and 30 do not touch each other to further reduce the thermal energy exchange between the relatively cooler inbound fluid in inlet conduit 26 and the relatively hotter outbound fluid in outlet conduit 30.

Referring to FIG. 1, outlet conduit 30 extends further into well 12 than inlet conduit 26 to optimize the time that the heat exchange fluid spends in well 12 absorbing the thermal energy from the earth. This time is referred to as the residence time of the heat exchange fluid. One way to determine residence time is to divide the volume of casing 18 below liquid level 38 by the rate at which fluid is delivered through inlet conduit 26. In other embodiments, the residence time can be determined by other means. In FIG. 1, liquid level 38 is the level of the heat exchange fluid that is maintained in well 12 during the thermal energy extraction operation. In one embodiment, liquid level 38 is at or around a location where temperature losses from outlet conduit 30 become excessive. The effective residence time of fluid in the heat exchange chamber can also be controlled by configuring the size and location of the inlet and outlet conduits and by regulating the rate at which the fluid circulates through the geothermal well. At least the formation temperature and/or desired fluid temperature at the surface affect the residence time. For instance, formations with higher temperature can allow for shorter residence time while lower temperature formations can require longer residence time and lower flow rate. Similarly, if a higher desired temperature of the heat exchange fluid at surface can require longer residence time while a shorter residence time can be sufficient to obtain a lower desired temperature, depending on the formation temperature.

In another embodiment, well 12 further comprises a gas filled region above liquid level 38 to additionally reduce heat loss of the heat exchange fluid flowing to the surface through outlet conduit 30. Referring to FIG. 1, system 10 comprises sensor 42 on well head 26 to determine the location of liquid level 38 in well 12 and gas injection/release system 44 to control the height of liquid level 38 and maintain liquid level 38 at a desired level. Sensor 42 can be of any suitable type such as a sound generator and echo receiver. In one embodiment, sensor 42 includes output wire or lead 46 connected to motor valve 48, which is part of system 44 for manipulating valve 48 and delivering a gas from source 50 through well head 28. In one embodiment, valve 48 is a three-way type valve with port 52, which is open to the atmosphere for releasing gas from the well 12 when necessary or desired. Operation of valve 48 allows system 44 to control the height of liquid level 38 in well 12. For instance, if sensor 42 detects that liquid level 38 is above a desired level or height, it can alert system 44, which can open valve 48 to inject gas into well 12. The addition of gas to well 12 pushes upon the liquid in well 12, thereby lowering liquid level 38. On the other hand, if sensor 42 detects that liquid level 38 is below a desired level or height, it can alert system 44, which can set valve 48 to release gas from well 12 to the atmosphere. The release of gas from well 12 reduces the pressure acting on the liquid in well 12, thereby allowing liquid level 38 to rise. The desired height of liquid level 38 is based on various operating factors of a particular well. The gas zone maintained above liquid level 38 preferably provides a region of relatively slow heat transfer in the upper part of well 12, thereby maintaining the high temperature of the exiting heat exchange fluid.

In one embodiment, the gas injected into well 12 comprises air, nitrogen, argon, any other suitable or similar gas compositions, or a combination thereof. The type or composition of the gas injected can depend at least on the particular conditions of the well, surrounding environment, and/or available resources. In the preferred embodiment, the injected gas is under high pressure, e.g., greater than atmospheric pressure, to establish and maintain a high pressure gas zone above liquid level 38. The pressure can be determined at least by the operating conditions of a particular well and/or desired output temperature. The high pressure zone prevents premature flashing of a heat exchange liquid because the high pressure zone increases the boiling point of the heat exchange fluid, such as water. As such, the high pressure zone can be maintained at a level that maintains the heat exchange fluid in liquid phase when it exits well 12 through outlet conduit 30. In the embodiment where a high pressure zone is employed, the pressure of the heat exchange liquid can also be adjusted to maintain liquid level 38 in a desired region. The high pressure gas zone above liquid level 38 also helps to keep system 10 in stasis by keeping the heat exchange fluid in liquid phase, thereby maintaining the entering fluid in the same phase as the exiting fluid. Further, the high pressure gas zone above liquid level 38 also provides insulation to minimize the thermal energy exchange between inlet conduit 26 and outlet conduit 30, in addition to any other insulating mechanism that can be employed, such as a jack or double-wall portions. The optimal or desired pressure varies with each well and depends on the operating conditions and/or desired temperature of the heat exchange fluid at the surface.

The energy extraction system 14 can be of a conventional type that comprises flash drum 54 connected to output conduit 30 for flashing steam from the exiting heat exchange fluid. Flash drum 54 can be connected to a generator turbine assembly 56 or some other mechanism operated by steam to produce energy or harvest the thermal energy in some other way. In addition to harvesting thermal energy, energy extraction system 14 can include lower pressure components to produce additional work from the extracted fluid in a desired region. For instance, a second process can be used to harvest the lower temperature, lower pressure heat exchange fluid after it has gone through flash drum 54 to convert at least a portion of the remaining heat into additional work, e.g., via a heat exchanger that has a lower boiling point.

After going through flash drum 54, all of the produced heat exchange fluid returns to well 12 through inlet conduit 26. System 10 can include other components such as condensers and/or pumps, represented as element 60 in FIG. 1, that are used to process the heat exchange fluid prior to returning it back to well 12. The type of equipment can be based at least on the operating conditions of a particular well, surrounding environment, and/or available resources.

Figures 2A, 2B:
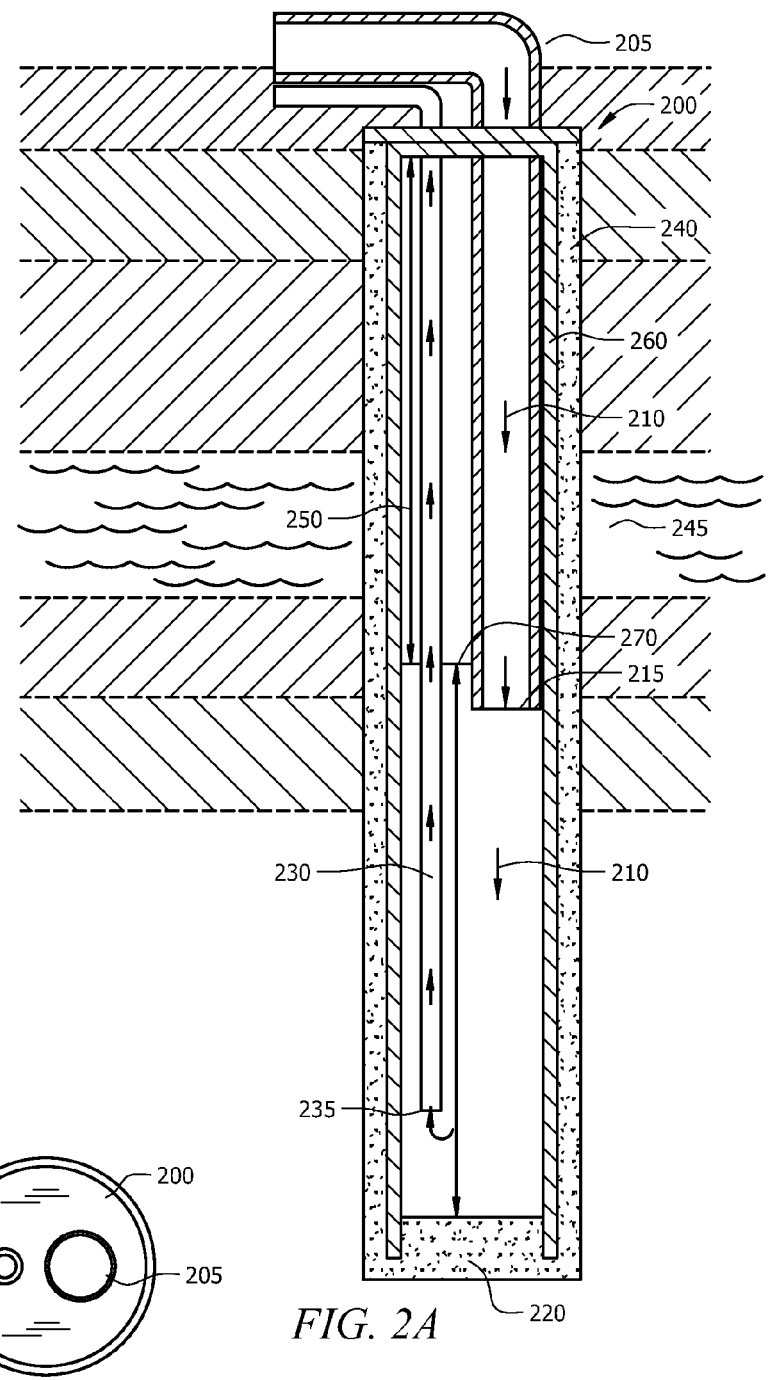
FIG. 2 illustrates a flow path of a heat exchange fluid in a well according to the first embodiment of the present disclosure shown in FIG. 1.

FIG. 2A illustrates the flow of the heat exchange fluid through an exemplary well of the present disclosure. In FIG. 2A, there is vertical well 200 in casing 260 that is cemented in place with cement sheath 240 and plugged with cap or plug 220. Inlet conduit 205 supplies working fluid or heat exchange fluid 210 that travels through inlet conduit 205 and exits at end 215 of inlet conduit 205 to enter well 200 and flow toward the bottom of well 200. Heat exchange fluid 210 absorbs thermal energy from the earth when it is in well 200. After absorbing the thermal energy, heat exchange fluid 210 returns to the surface through outlet conduit 230. As shown, entrance 235 of outlet conduit 230 is deeper in the subterranean region (i.e., further from the surface 240) than end 215 of inlet conduit 205. Also, the diameter outlet conduit 230 is smaller than the diameter of inlet conduit 230.

In one embodiment, the underground formation has subterranean water 245, which enhances the thermal energy transfer from the earth to the heat exchange fluid. In another embodiment, the well 200 further comprises a high pressure gas zone 250 above the liquid level 270. As discussed above, the high pressure gas zone 250 improves the operations of the system by at least providing insulation and keeping the exiting heat exchange fluid in liquid phase. As discussed above and shown in FIG. 2B, the diameter of the outlet conduit 230 is preferably smaller than the diameter of the inlet conduit 205. The difference in capacity between inlet conduit 205 and outlet conduit 230 allows for a greater velocity of heated working fluid 210 through outlet conduit 230, thereby minimizing the travel time of the heat exchange fluid 210 out of well 200, and consequently, the heat loss due to the incoming heat exchange fluid 210 from inlet conduit 205. In the preferred embodiment, casing 260 is imperforate, thereby preventing heat exchange fluid 210 from escaping into the surrounding environment or any contamination of heat exchange fluid 210 by particulates or fluids from the surrounding environment.

As discussed above, well 200 can further comprise thermal insulation to at least outlet conduit 230. While FIG. 2A shows portions of inlet conduit 205 and outlet conduit 230 above the well 200 adjacent one another, other embodiments can arrange for these portions of the conduits to be further apart and/or insulated. The length of the outlet conduit 230 can be determined based at least on flow rate, diameter of the conduit, and/or modeling data for that system.

FIGS. 3A and 3B demonstrate one embodiment of the construction of a geothermal well according to the present disclosure. In FIG. 3A, there is casing 300 in open hole 310. Casing 300 is preferably made of steel. Instead of cementing casing 300 in open hole 310 along substantially the full length of casing 300, which is often done in conventional methods, casing 300 is cemented near the top and plugged with cement at the bottom, as shown in FIG. 3B and discussed further below, which is sufficient to hold casing 300 in place in open hole or wellbore 310. Referring to FIGS. 3A and 3B, one way to achieve the selective cementing of casing 300 is to insert conduit 320 into casing 300 to first introduce cement into annular space 380 between open hole 310 and the outer wall of casing 300 to form a cemented top region 360. Subsequently, thermally conductive material 340 is introduced into annular space 380 through conduit 320 to substantially fill annular space 380 to form wall 370 surrounding at least a portion of casing 300. Wall 370 comprises thermally conductive material 340. After a sufficient or desired amount of thermally conductive material 340 is delivered to annular space 380, cement 330 is then delivered through conduit 320 to form cement base 350 at the bottom of the casing 300. The well configuration shown in FIGS. 3A and 3B provides a more thermally conductive system by replacing the thermally non-conductive cement material with a more thermally conductive material while still allowing casing 300 to be held in place in open hole 310 with sufficient cementing of the casing 300 near the top and bottom of open hole 310.

Figures 4A, 4B, 4C:
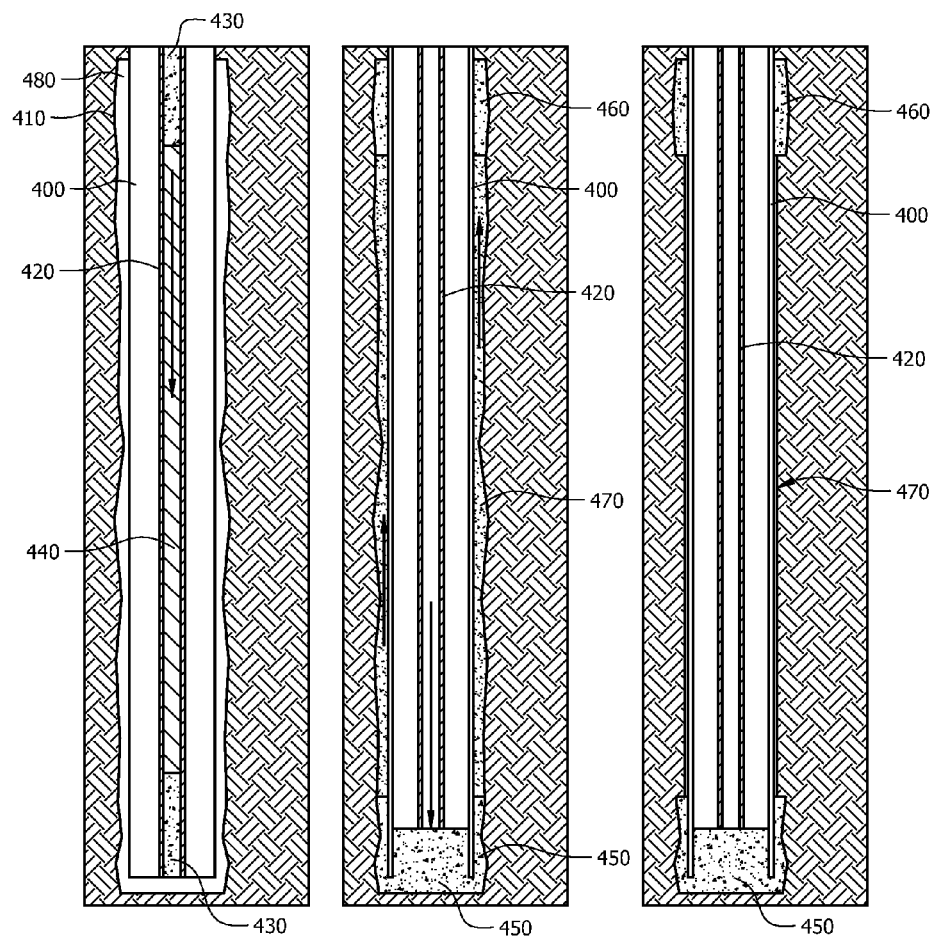
FIGS. 4A, 4B, and 4C illustrate a second exemplary well configuration according to the present disclosure.

FIGS. 4A, 4B, and 4C similarly demonstrate another embodiment of the well configuration shown in FIGS. 3A and 3B. In this embodiment, the thermally conductive material forming the thermally conductive wall comprises fresh water. Referring to FIGS. 4A-4C, one way of achieving a thermally conductive wall comprising fresh water is to first introduce cement 430 into annular space 480 between open hole 410 and the outer wall of casing 400 through conduit 420 to fours cemented top region 460. Subsequently, fresh water is introduced into annular space 480 through conduit 420 to substantially fill annular space 480 to form wall 470 surrounding at least a portion of casing 400. The fresh water can provide an advantage in certain systems of the present disclosure because it is often quickly absorbed into the formation due to the osmotic pressure that develops as a result of the high salt content of the formation water and the fresh water. As a result, when the fresh water is absorbed by the surrounding formation, at least a portion of the subterranean environment in which the geothermal well is situated will collapse or swell onto the casing 400, thereby providing a direct thermal contact between the geothermal resource and the casing 400, as shown in FIG. 4C. After a sufficient or desired amount of fresh water is delivered to the annular space 480 or the desired collapse or swelling of the surrounding formation is achieved, additional cement 430 is delivered through conduit 420 to form cement base 450 at the bottom of casing 400. The well configuration shown in FIGS. 4A, 4B, and 4C increases thermal conductivity between the earth and the thermal extraction system and obviates the need for an intermediate fluid or material between the earth and the casing. This is achieved by replacing a substantial amount of cement surrounding casing 400 while still allowing casing 400 to be held in place in open hole 410 with sufficient cementing of the casing 400 near the top and bottom of open hole 410. Alternative, an intermediate fluid or other material can still be used if formation conditions or other logistical considerations so dictate.

In one embodiment, the ratio of the internal diameter of the injection conduit (denoted "A") to the internal diameter of the production conduit (denoted "B") of the various embodiments of the present disclosure, expressed as A:B, is greater than 1. In one embodiment, A:B is greater than 1.5. In another embodiment, A:B is greater than 2. Preferably, A:B is greater than 2.5. In the example provided below, A:B is equal to 2.667 (i.e., 8:3). However, in another embodiments, A:B is greater than 3. In yet another embodiment, A:B is greater than 3.5. On other embodiments, A:B is greater than 4, greater than 5, and in a number of other embodiments, A:B is greater than 6, 7, 8, 9, 10, 20, 50, and 100, respectively.

EXAMPLE 1

An example of a preferred embodiment is provided below. In this example the ratio of the injection conduit diameter to production conduit diameter is 8:3, using a 17 inch cased well pipe as the reservoir. This example uses three pipe sizes, defined by the inside diameter (ID). It uses a 17 inch (43.18 cm) pipe that serves as the cased well pipe, an 8 inch (20.32 cm) pipe that serves as the injection conduit; and a 3 inch (7.62 cm) pipe that serves as a production tube conduit.

With regard to the 17 inch cased pipe has 2724.8076 cubic inches per linear foot. There are 231 cubic inches of liquid in a gallon, which results in about 11.7957 gallons per linear foot of the 17 inch cased pipe. As there are 5,280 feet/mile, there are 62,281.296 gallons in one mile. At a flow rate of 1000 gallons per minute, it takes 62.281 minutes for a water molecule to travel through one mile of 17 inch cased well. This gives a velocity of 0.96 miles per hour.

With regard to the 8 inch injection tube conduit, the conduit has 603.4176 cubic inches per linear foot. Again there are 231 cubic inches of liquid in a gallon, thus yielding 2.61219 gallons per linear foot. This yields 13792.3632 gallons in one mile of the 8 inch injection tube conduit. At a flow rate of 1000 gallons per minute, it takes about 13.762 minutes for a water molecule to travel through one mile of the 8 inch injection tube conduit, corresponding to a velocity of 4.3598 miles per hour.

The 3 inch production tube conduit has 84.8556 cubic inches per linear foot. Using 231 cubic inches of liquid in a gallon, one obtains about 0.36734 gallons per linear foot. This yields 1939.552 gallons in one mile of the 3 inch production tube conduit. At a flow rate of 1000 gallons per minute, it takes 1.939 minutes for a water molecule to travel through one mile of 3 inch production tube conduit, corresponding to a velocity of 30.9437 miles per hour.

The differential velocities in the production tube conduit and the injection tube conduit improves the efficiency of heat transfer of reservoir heat from the reservoir to the surface. In particular, the difference in velocities provides a relatively short residence time of the working fluid in the production tube conduit, which decreases heat transfer losses, resulting in greater heat capture efficiencies.

The present invention is advantageous in that it can be used to extract only heat from the reservoir without extracting reservoir fluids such as water out of the reservoir. It uses a recycled working fluid as a heat transfer medium and is useful for both shallow and deep heat resources. The preferred embodiment makes use of a vertical well and creates a flow path for the working fluid into the reservoir at high pressures. However, it should be understood that this invention is applicable to any other well geometry. The preferred embodiment uses a cased well with a plug at the bottom for isolation from the external environment.

In addition, certain embodiments can employ pipes or conduits with enhanced surface areas, which provides greater heat transfer efficiency. In one embodiment, the greater or enhanced surface area is achieved by "dimpling" of the pipe or conduit surface. One exemplary "dimpling" configuration is illustrated in FIG. 5A. In one embodiment, pipe 500 comprising dimples 510 is illustrated in FIG. 5A. Another embodiment is shown in FIG. 5B, where the cavities 520 of dimples 510 are configured to have a curvature that achieves the flow pattern as shown by the arrows. This flow configuration provides a channel 530 through which a fluid can flow. This channel 530 improves the flow of the fluid by reducing the friction between the fluid and the inner surface of the pipe, as well as providing an effectively smaller flow diameter, which can increase the velocity of the fluid. Although dimpling of the pipes is preferred, it should be understood that other surface features which increase the surface area may also be used. In addition to increasing the surface area on both walls (interior and exterior) of the pipe, the use of dimples or other surface area-enhancing surface features, also results in efficient thermal mixing of the working fluid through the turbulence that results when the working fluid meets the interior surface features 520. Alternatively, metallic (or other composition) fins attached to the wall of the conduit extend into the soil for enhanced heat transfer.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A well extending from a location at or above the surface of the earth to a subterranean environment, said well comprising:
   a wellhead at or above said surface of the earth;
   a wellbore extending from said surface of the earth to said subterranean location;
   a casing between said wellbore and said earth;
   an injection conduit disposed in said casing, a portion of said injection conduit extended from said surface to a first location in said subterranean environment, wherein said injection conduit has a first inner diameter;
   a production conduit disposed in said casing, a portion of said production conduit extended from said surface to a second location in said subterranean environment, wherein said production conduit has a second inner diameter;
   a plug between the distal end of said casing and the wellbore, wherein the casing, wellhead, and plug provide a closed chamber,
   wherein said production conduit is fluidly coupled to said injection conduit within said chamber, said first inner diameter is greater than said second inner diameter;
   a volume of heat exchange fluid in liquid form; and
   a gas zone above said volume of heat exchange fluid, said gas zone is disposed in said casing.

2. The well of claim 1, wherein said heat exchange fluid comprises a fluid selected from the group consisting of water, alcohol, refrigerant, and a combination thereof.

3. The well of claim 1, wherein said gas zone is at a pressure greater than atmospheric pressure.

4. The well of claim 1 wherein said gas zone comprises a gas selected from the group consisting of air, nitrogen, argon, and a combination thereof.

5. The well of claim 1, wherein a ratio of said first inner diameter to said second inner diameter is selected from the group consisting of 8.3, greater than 1, greater than 1.5, greater than 2, and greater than 2.5.

6. The well of claim 1 further comprising an energy extraction system fluidly coupled to said production conduit.

7. The well of claim 1, wherein said production conduit comprises a thermally-insulating material for at least a portion of the length of said production conduit.

8. The well of claim 1, wherein at least a portion of said casing direct contacts the subterranean environment.

9. The well of claim 1 wherein said casing is imperforate.

10. The well of claim 1, wherein at least a portion of said casing is surrounded by a thermally conductive wall.

11. The well of claim 1, wherein at least one of said injection conduit and said production conduit comprises one or more modified surface features disposed in the interior wall of the respective conduit, said one or more modified surface feature configured to reduce the friction between the heat exchange fluid and the inner surface of at least one of the injection conduit and the production conduit.

12. The well of claim 11, wherein said surface features comprise dimples.

13. A method of harvesting thermal energy comprising:
    introducing, at a first velocity, a heat exchange fluid into a wellbore through an injection conduit disposed in a casing of said wellbore, wherein a portion of said wellbore is disposed in a subterranean environment;
    transferring, into said heat exchange fluid, heat from the subterranean environment external to said casing; and
    extracting, at a second velocity, said heat exchange fluid from said wellbore through a production conduit disposed in said casing,
    wherein said second velocity is faster than said first velocity; and
    maintaining a gas zone in said casing above a volume of heat exchange fluid, wherein said volume of heat exchange fluid is in liquid form.

14. The method of claim 13, wherein said heat exchange fluid is selected from the group consisting of water, alcohol, refrigerant, and a combination thereof.

15. The method of claim 13, wherein said gas zone is at a pressure greater than atmospheric pressure.

16. The method of claim 13, wherein said gas zone comprises a gas selected from the group consisting of air, nitrogen, argon, and a combination thereof.

17. The method of claim 13, wherein said second velocity being faster than said first velocity is achieved at least by said injection conduit having a diameter that is different from a diameter of said production conduit.

18. The method of claim 17, wherein a ratio of the diameter of said injection conduit to the diameter of said production conduit is selected from the group consisting of 8.3, greater than 1, greater than 1.5, greater than 2, and greater than 2.5.

19. The method of claim 13 further comprising the step of producing energy from said extracted heat exchange fluid.

20. The method of claim 13 further comprising the step of insulating a portion of said production conduit.

21. The method of claim 13 further comprising the steps of providing a thermally conductive wall around a portion of said casing.

22. The method of claim 13 wherein said casing is imperforate.

23. The method of claim 13 further comprising the steps of exposing a portion of the exterior of said casing to said subterranean environment.

24. The method of claim 13 further comprising the step of providing at least one of said injection conduit and said production conduit with an enhanced surface area disposed in the interior wall of the respective conduit, said enhanced surface area comprises at least one modified surface feature configured to reduce the friction between the heat exchange fluid and the inner surface of at least one of the injection conduit and the production conduit.

* * * * *